H. & F. RÖWER.
PLOW.
APPLICATION FILED SEPT. 29, 1910.
996,145.
Patented June 27, 1911.
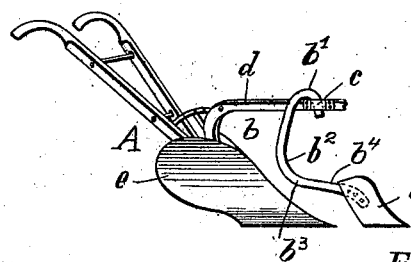
Fig. 1.
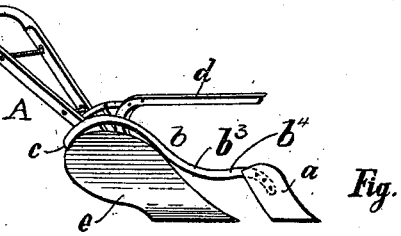
Fig. 2.
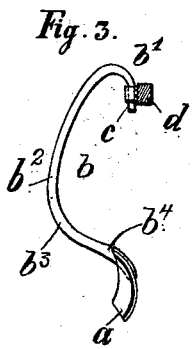
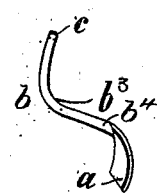
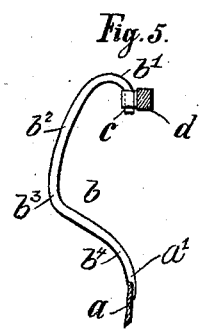
THE NORRIS PETERS CO., WASHINGTON, D. C.

UNITED STATES PATENT OFFICE.

HEINRICH RÖWER AND FRITZ RÖWER, OF BLENDER, GERMANY.

PLOW.

996,145.

Specification of Letters Patent. Patented June 27, 1911.

Application filed September 29, 1910. Serial No. 584,539.

*To all whom it may concern:*

Be it known that we, HEINRICH RÖWER and FRITZ RÖWER, both subjects of the Emperor of Germany, and residents of Blender, Province of Hanover, Germany, have invented certain new and useful Improvements in Plows, of which the following is a full, clear, and exact specification.

The present invention relates to weed guides for plows or the like, and is adapted to be secured to the plow structure in such a manner that the weeds, stalks or the like located in the path of the plow will not become lodged in front of the plow, and thus avoid their being carried thereby during the plowing.

The objects of our invention are therefore, to provide a means which will contribute to the ease of plowing by disposing of the stalks, etc., before the plow share reaches them and guiding them to the furrow side of the plow where they are intermingled with the soil upturned by the mold board. This latter feature is very desirable when the stalks or matter are to act as a fertilizer to the soil. We accomplish these objects by so shaping the weed guide, and securing it to the plow structure in such a manner that the weeds, stalks and the like disturbed by the forward end of the device, will be guided therefrom to a position where the soil turned by the mold board will throw it to the furrow side of the plow.

In the accompanying drawong forming a part of this specification,—Figure 1 is a perspective view showing a weed guide, embodying our invention, attached to the beam of a plow. Fig. 2 is a perspective view in which a weed guide, embodying our invention, is secured to the upper rear portion of the mold board. Fig. 3 is a front elevation of the weed guide shown in Fig. 1, and its position with respect to the plow beam. Fig. 4 is a similar view of the weed guide shown in Fig. 2. Fig. 5 is a view similar to Fig. 3 but showing the forward end of the device in section.

Similar letters refer to similar parts throughout the several views.

In the drawings, A represents a plow having the usual beam $d$ and mold board $e$.

With reference to Fig. 1, a weed guide $b$ is secured to the plow beam $d$ at $c$. Any suitable means may be utilized to secure the guide $b$ to the plow structure. At the forward end of the guide, and in front of and in alinement with the plow share is a cutting or disturbing member $a$, having an inclined guiding surface extending rearwardly from the front thereof. It will be seen that a portion $b^4$, of the guide $b$, is secured to the member $a$, near the edge of the latter protruding in the direction of the furrow side of the plow and in such a manner that it will not act as a lodging place for weeds, straw, etc. This may be accomplished by forming a seat or recess $a'$, in the arm $b$, into which a part of the rear portion of the member $a$, fits, as shown in Fig. 5, and secured thereto by any suitable means such as rivets or bolts.

As shown in Fig. 1, the upper portion of the weed guide $b$, as indicated at $b'$, is curved from its point of connection with the plow beam $d$, in the direction of the furrow side of the plow, and then downwardly, as indicated at $b^2$, to a curved portion $b^3$. At this point the arm is formed to lie in substantially a horizontal plane, as indicated at $b^4$, extending in a direction of the front of a plow. This portion $b^4$, is also bent inwardly, bringing the member $a$, connected thereto, in front of and in line with the front edge of the mold board.

In Fig. 2, the weed guide $b$, is connected to the rear upward portion of the mold board from which it projects toward the front of the plow and downwardly to the curved portion $b^3$, from which it assumes the same shape and relative position as that described in connection with Fig. 1. In both cases, the weed guide is so constructed and connected to the plow structure that the curved portion $b^3$, is in the path of the upturning soil of the mold board, from which it will be seen that in operation the weeds, straw, stalks or the like, disturbed or uprooted by the member $a$, will slide along the weed guide portion $b^4$, until it reaches the curved portion $b^3$, where it will stop owing to the steep incline of the portion $b^2$, and will here be thrown from the device by the upturned soil from the mold board $e$. Thus the soil broken by the plow is utilized to remove the weeds, etc., from the weed guide and deposit them in the furrow made by the plow.

What we claim is:

In combination with a plow structure having a plow beam, mold board and plow share, of a weed guide therefor comprising a cutting member, having an inclined guiding surface, disposed in advance of and in alinement with the said plow share and adapted to dislocate weeds, stalks, and the like, in the path thereof, a guide member extending rearwardly from, and as a continuation of the said guiding surface of said cutting member, in substantially a horizontal plane and extending diagonally and outwardly in the direction of the furrow side of the plow, an upturned portion therefrom overhanging the soil upturned by the said mold board in engaging proximity with the stubble thereof, and means securing said weed guide to said plow structure, substantially as and for the purpose set forth.

In testimony whereof we affix our signatures in presence of two witnesses.

HEINRICH RÖWER.
FRITZ RÖWER.

Witnesses:
OTTO RÖHLK,
THEODOR FRANKE.

Copies of this patent may be obtained for five cents each, by addressing the "Commissioner of Patents, Washington, D. C."